United States Patent
Stojanovski

(10) Patent No.: US 7,278,196 B1
(45) Date of Patent: Oct. 9, 2007

(54) INTERLOCKING TOOL HOLDER

(76) Inventor: Stojan Stojanovski, 13300 W. Star Dr., Shelby Township, MI (US) 48315

( * ) Notice: Subject to any disclaimer, the term of this patent is extended or adjusted under 35 U.S.C. 154(b) by 0 days.

(21) Appl. No.: 11/413,847

(22) Filed: Apr. 29, 2006

(51) Int. Cl.
    *B23P 11/02* (2006.01)
(52) U.S. Cl. .................. 29/447; 409/232; 409/234; 408/239 R; 279/8
(58) Field of Classification Search .................. 29/447, 29/33 K, 39, 40, 27 C, 27 R; 409/231, 232, 409/233, 234; 408/239 R, 238, 239 A, 240, 408/226, 716, 57, 59; 279/8, 102, 103, 42, 279/48, 52, 43.9, 46.9, 51, 56, 57, 83, 97, 279/143, 145; 403/374.1, 374.2, 374.3, 374.4, 403/373; 82/158, 159, 160; 411/60.1, 60.2, 411/55, 57.1, 271, 325
See application file for complete search history.

(56) References Cited

U.S. PATENT DOCUMENTS

| | | | | |
|---|---|---|---|---|
| 4,226,562 A * | 10/1980 | Schmid et al. | .............. | 409/233 |
| 4,557,642 A * | 12/1985 | Dudás et al. | ........... | 408/239 R |
| 4,621,960 A * | 11/1986 | Tollner | ........................ | 409/232 |
| 4,865,336 A * | 9/1989 | Keritsis | ....................... | 279/9.1 |
| 5,582,494 A * | 12/1996 | Cook | ............................ | 29/447 |
| 5,593,258 A * | 1/1997 | Matsumoto et al. | ........ | 409/234 |
| 5,716,173 A * | 2/1998 | Matsumoto | ............. | 408/239 A |
| 5,873,687 A * | 2/1999 | Watanabe | .................... | 409/234 |
| 5,927,913 A * | 7/1999 | Mizoguchi | .................. | 408/238 |
| 5,984,595 A * | 11/1999 | Mizoguchi | .................... | 408/57 |
| 6,077,003 A * | 6/2000 | Laube | ........................ | 409/234 |
| 6,352,395 B1 * | 3/2002 | Matsumoto et al. | ........ | 409/234 |
| 6,394,466 B1 * | 5/2002 | Matsumoto et al. | .......... | 29/447 |
| 6,599,068 B1 * | 7/2003 | Miyazawa | .................... | 409/234 |
| 6,923,451 B2 * | 8/2005 | Taguchi et al. | ............... | 279/42 |
| 6,926,478 B2 * | 8/2005 | Sugata et al. | ............... | 409/136 |
| 6,964,547 B2 * | 11/2005 | Stojanovski | ................ | 409/233 |
| 6,971,825 B2 * | 12/2005 | Stojanovski | ................ | 409/233 |
| 7,077,608 B2 * | 7/2006 | Hartman | ...................... | 29/447 |
| 7,137,185 B2 * | 11/2006 | Voss et al. | ..................... | 29/447 |
| 7,182,558 B2 * | 2/2007 | Haimer | ........................ | 29/447 |
| 7,186,064 B1 * | 3/2007 | Erickson et al. | ............ | 409/234 |
| 7,192,228 B2 * | 3/2007 | Haenle et al. | .............. | 409/234 |

\* cited by examiner

*Primary Examiner*—Dana Ross
(74) *Attorney, Agent, or Firm*—Charles W. Chandler

(57) ABSTRACT

An end mill chucking structure for chucking an end mill. The chucking structure includes an end mill holder; a shank receivable in an axial opening in the holder; a cone having an exterior cone shape adapted to be received in a drive spindle and an axial opening that is telescopically received on the shank; and a retention knob mounted on the cone and connected to the shank for axially pulling the shank toward a position in which an integral neck on the cone is received in an opening in the tool holder. The retention knob is rotated to pull the neck into a tapered structure on the shank to wedge the neck in the tool holder.

7 Claims, 5 Drawing Sheets

INTERLOCKING TOOL HOLDER

BACKGROUND AND SUMMARY OF THE INVENTION

This invention is related to a chuck for connecting an end mill to a drive spindle. The chucking structure includes a cone that is received in a rotating spindle, a shank that is telescopically received in the cone and threadably received in a tool holder body. A retention knob joins the cone to the tool holder body by expanding a collar on the cone into an opening in the tool holder body as the retention knob is rotated.

Several forms of chucking structures are known for connecting an end mill to a rotating spindle, generally using a tapered body that is received in a tapered opening in the spindle.

Art that has addressed this problem include U.S. Pat. No. 6,394,466 issued May 28, 2002 to Masakazu Matsumoto et al. for an End Mill Chucking Structure, and U.S. Pat. No. 6,923,451 issued Aug. 2, 2005 to Masahiro Taguchi et al. for a Tool Holder.

The broad purpose of the present invention is to provide a tool holder chucking structure comprising a minimal number of components, and usable with a variety of commercially available spindles.

Still further objects and advantages of the invention will become readily apparent to those skilled in the art to which the invention pertains upon reference to the following detailed description.

BRIEF DESCRIPTION OF THE DRAWINGS

The description refers to the accompanying drawings in which like reference characters refer to like parts throughout the several views, and in which.

DETAILED DESCRIPTION OF THE INVENTION

Figure 1:
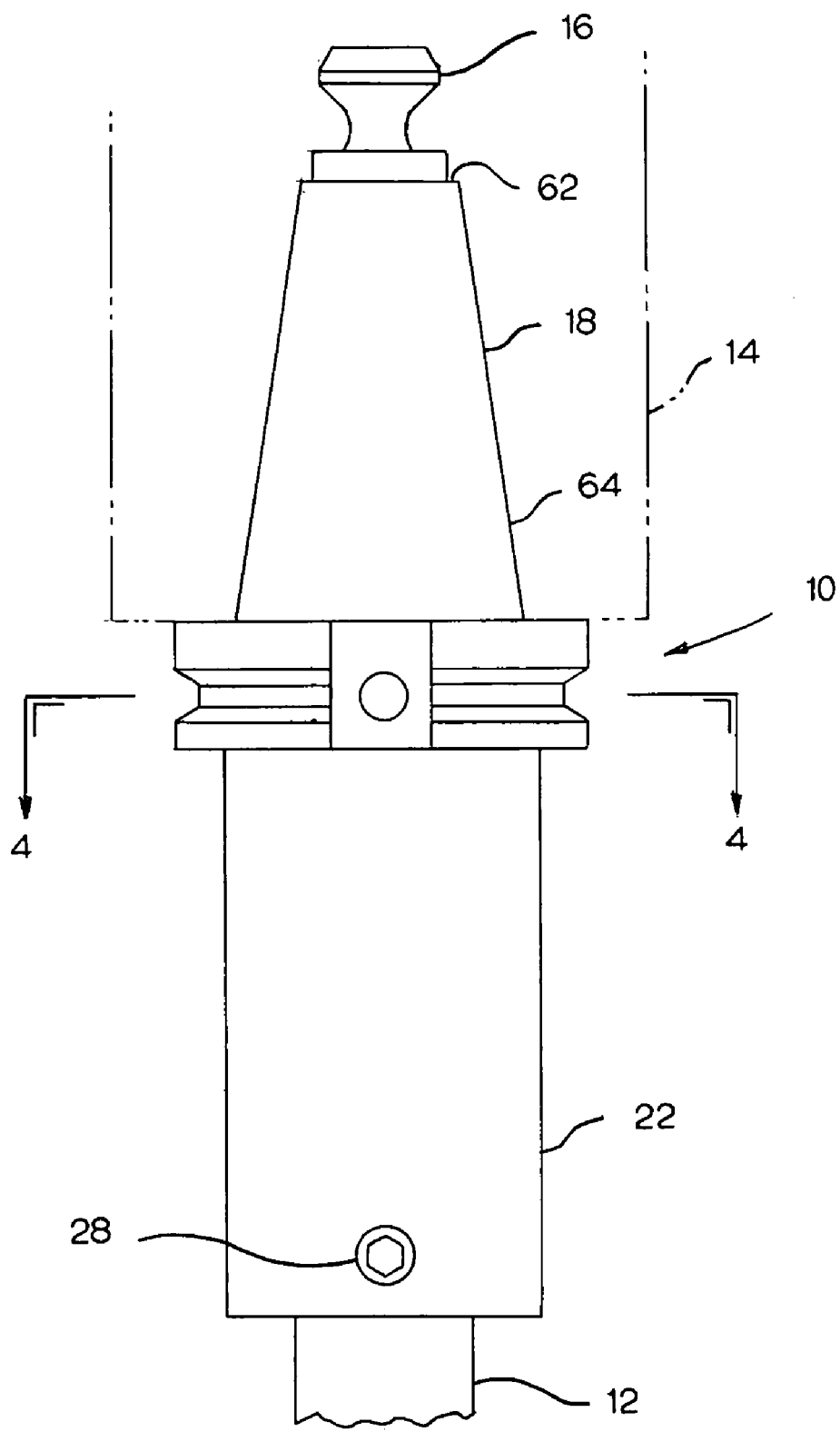
FIG. 1 illustrates a tool holder embodying the invention.

FIG. 1 illustrates a preferred tool holder 10 for joining a tool, such as end mill 12, to a rotatable drive spindle 14, shown in phantom. The tool can be any of a variety of rotatable cutting tools. The spindle is conventional and is used in a variety of commonly used power sources.

Tool holder 10 comprises a retention knob 16, a cone 18, a shank 20 and a tool holder body 22.

Figure 2:
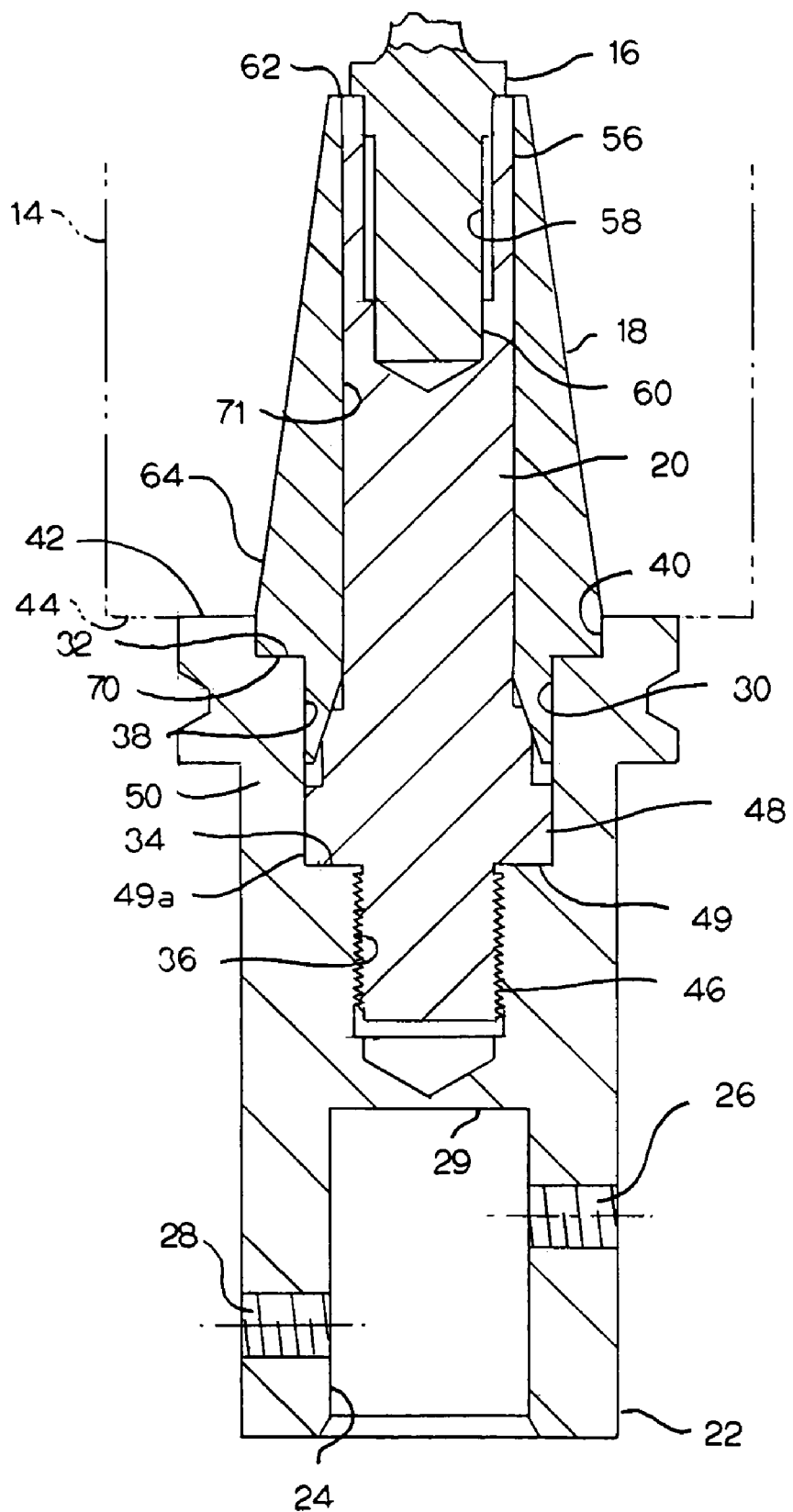
FIG. 2 is a longitudinal sectional view through the tool holder of FIG. 1.

Referring to FIGS. 1 and 2, body 22 has an axial tool-receiving cylindrical bore 24. The lower end of bore 24 is adapted to receive end mill 12. A pair of longitudinally offset threaded fasteners 26 and 28, mounted on opposite sides of body 22, provide means for joining end mill 12 to the tool holder body 22. Bore 24 has a blind end 29.

The upper end of body 22, as viewed in FIG. 2, has a stepped, shank-receiving bore 30. Bore 30 is axially aligned with bore 24, and has an upper annular shoulder 32 and a smaller, lower annular seat 34. Seat 34 is at the upper end of a female threaded section 36.

Bore 30 has a cylindrical wall 38 between shoulder 32 and seat 34. Bore 30 has a cylindrical wall 40 between shoulder 32 and an annular flange 42. Flange 42 abuts the lower surface 44 of spindle 14, when the tool is being rotated.

Shank 20 has a lower threaded end 46 that engages threaded section 36. Threaded end 46 joins an annular collar 48. Collar 48 has a lower face 49 that abuts seat 34 when the shank is fully joined to body 22. The outer cylindrical surface 49a of collar 48 is slidably received in cylindrical wall 38.

Figure 6:
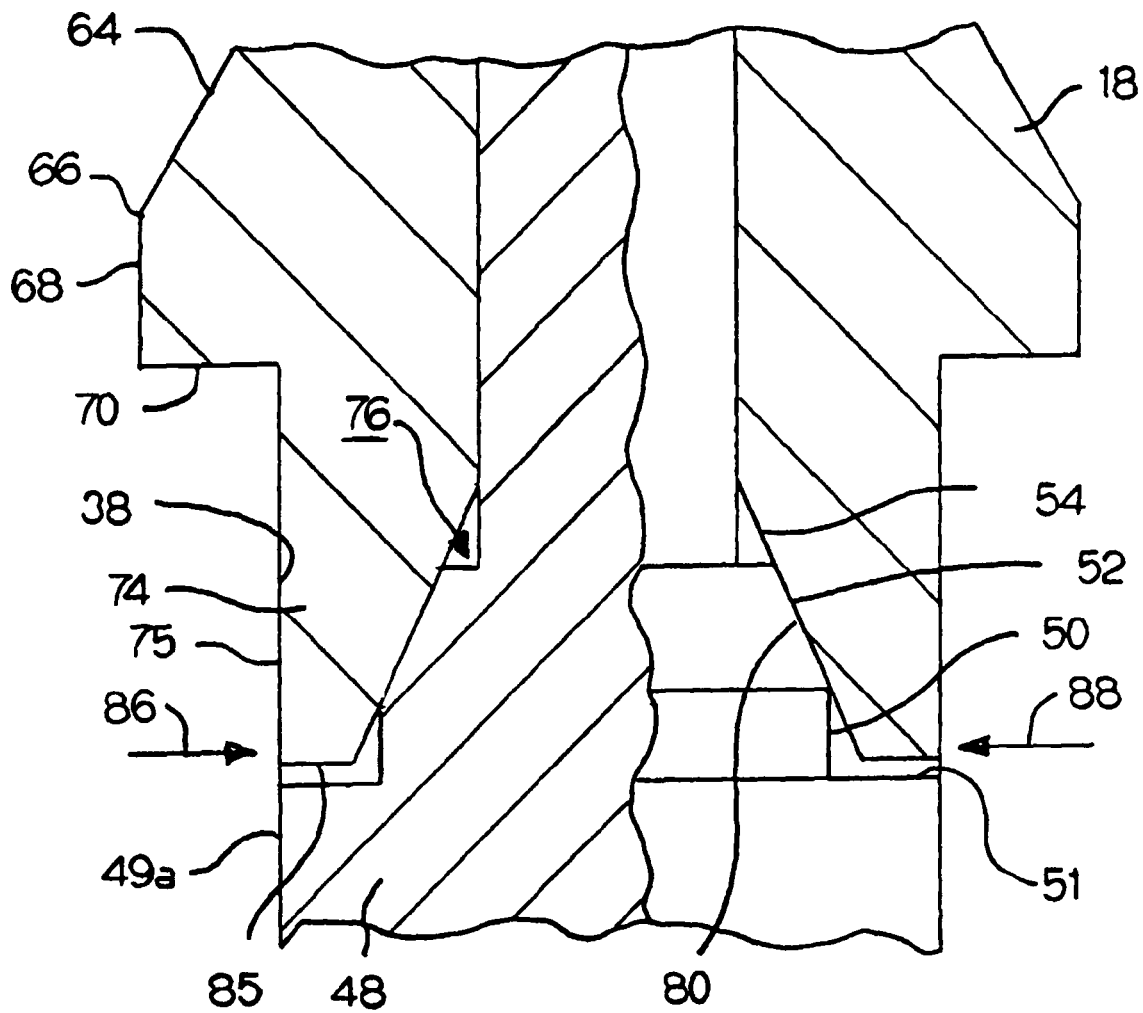
FIG. 6 is an enlarged fragmentary sectional view of the neck and tapered section of the shank.

Referring to FIG. 6, the shank has a narrow cylindrical section 50 that extends from the upper face 51 of the collar to the lower end of a tapered section 52. Tapered section 52 extends to a gage line 54. The balance of the shank is cylindrical from gage line 54 to the upper end 56 of the shank. The upper end of the shank has an internal threaded bore 58 which receives the lower threaded end 60 of retention knob 16.

Cone 18 has an upper bearing surface 62 for seating the retention knob, and a frustoconical wall 64 which progressively enlarges in diameter to a gage line 66. The outer cylindrical surface 68 of the cone extends from gage line 66 to a lower annular flat face 70. Cylindrical surface 68 slidably engages cylindrical wall 40 of the body. The cone has an axial bore 71.

Figure 3:
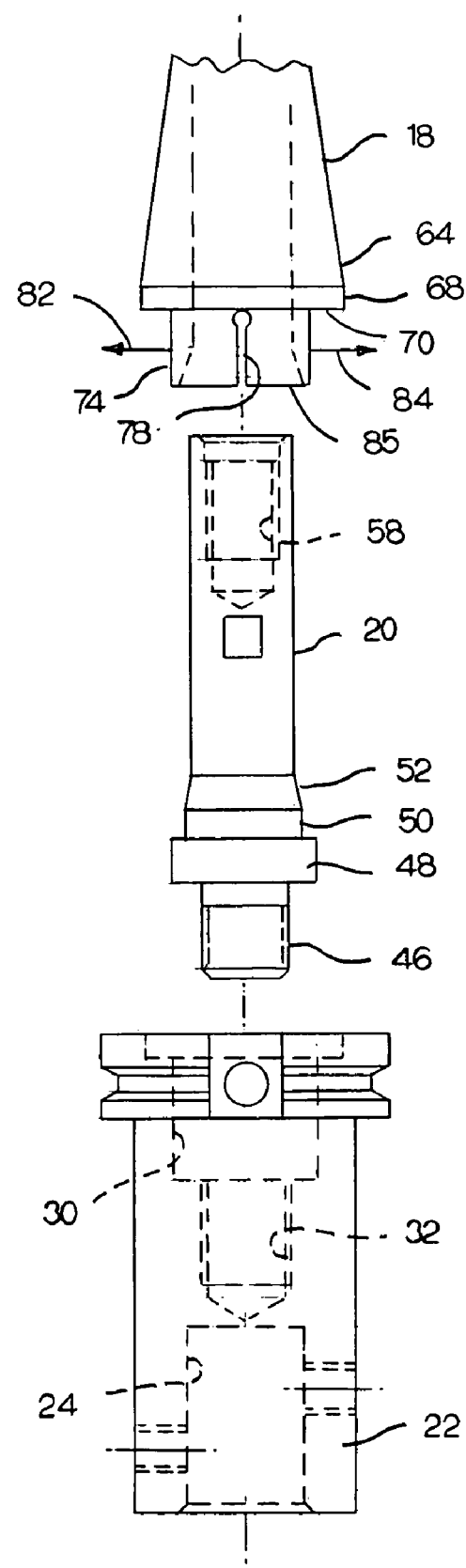
FIG. 3 is an exploded view of the major components of the tool holder.
Figure 4:
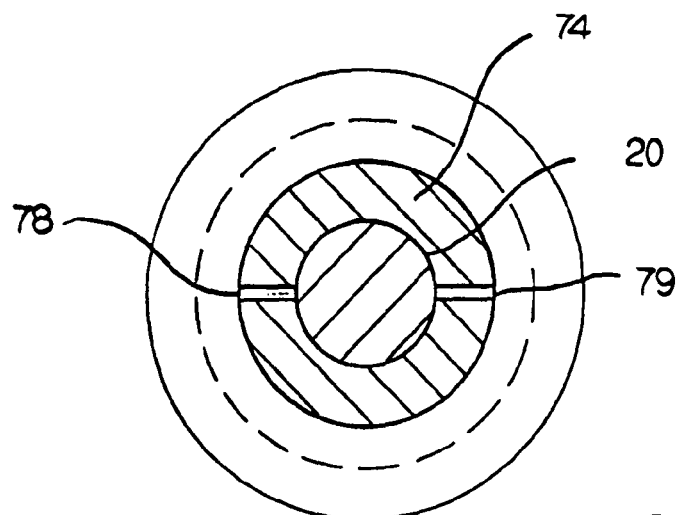
FIG. 4 is a sectional view as seen along lines 4-4 of FIG. 1.
Figure 5:
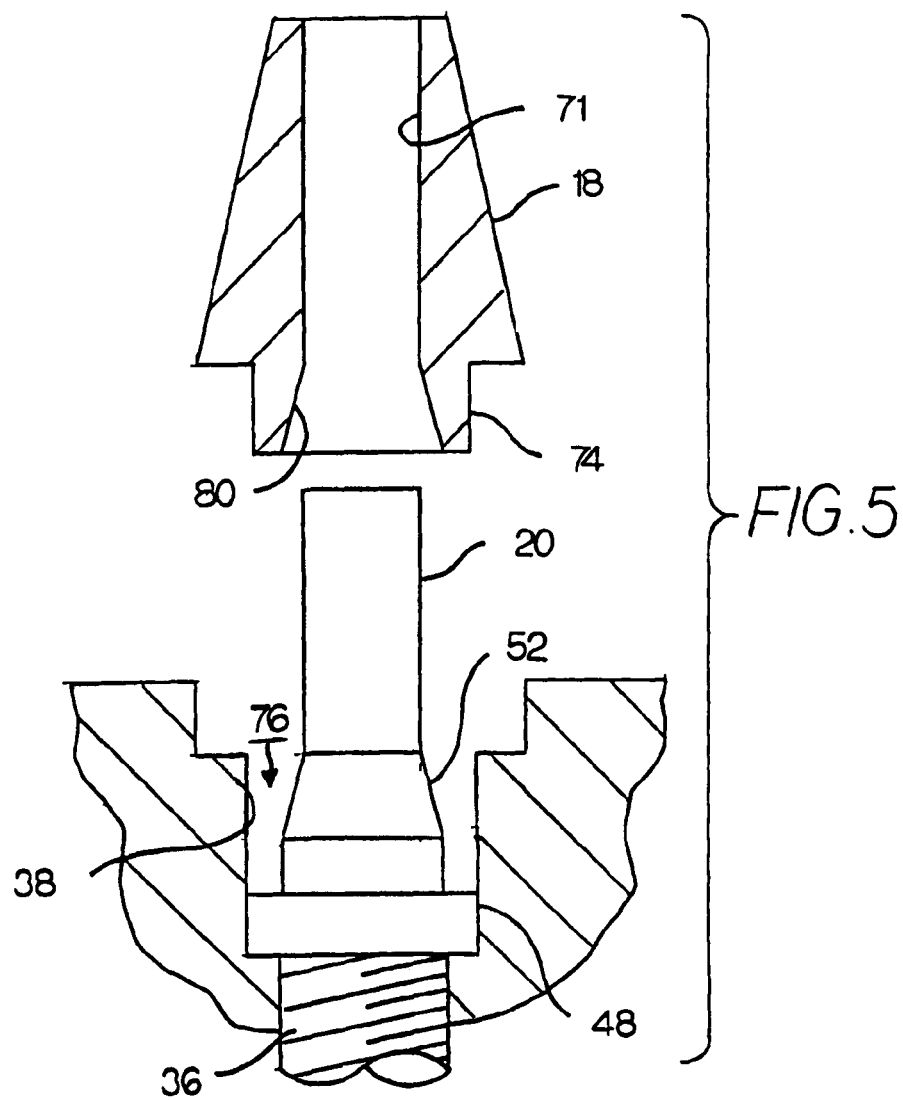
FIG. 5 is an enlarged view illustrating the manner in which the cone is joined to the tool holder body.

Referring to FIGS. 3 and 6, the lower end 72 of the cone forms a hollow neck 74. The outer surface 75 of neck 74 is cylindrical and is received in an annular chamber 76 existing between wall 38 of the body and tapered section 52 of the shank. Neck 74 has a pair of axial splits 78 and 79 (FIG. 4) which permit the neck 74 to radially expand. Neck 74 also has a tapered bore 80 that slidably engages the tapered section 52 of the shank.

The arrangement is such that as the cone is biased toward the shank collar, neck 74 is expanded by the tapered section of the shank in the direction of arrows 82 and 84, wedging the neck between the shank and the body. In this seated position, a small clearance exists between lower flat face 85 of the neck and the upper face 51 of the collar. Further, a clearance exists between flat face 70 of the cone and the upper shoulder 32 of the body.

Referring to FIG. 6, the lower end of the neck overlaps the narrow cylindrical section 50 of the shank so the extreme lower end of the neck is biased radially inwardly in the direction of arrows 86 and 88 while the major portion of the tapered bore of the neck is biased radially outwardly. This arrangement assists in forming a firm wedged connection between the cone and the body.

Having described my invention, I claim:

1. A tool holder suited to be removably received into a tapered opening in the spindle of a machine tool, comprising:
    a shank;
    a tool holder body having an axial opening with a first end for receiving a tool, a second end having an internal threaded means for receiving said shank, and an annular seat for seating said shank;
    wherein said shank has a first end for engaging the internal threaded means of the tool holder body such that a shank body is disposed axially beyond said annular seat, the shank having an annular collar suited for seating on said annular seat such that the shank and the holder body form an internal annular chamber adjacent said annular seat;

a cone having an external tapered wall formed about an axial opening and receivable in an opening of a rotatable drive spindle, the cone having a first end of a lesser diameter and a second end of a greater diameter, the cone having a radially expandable neck receivable in the internal annular chamber of the tool holder body when the cone is telescopically received on the shank; and knob means on the first end of the cone connected to the shank to axially move the cone toward the body to radially expand the neck to a wedged position between the tool holder body and the shank.

2. The tool holder of claim 1, in which the knob means comprises the shank having a threaded bore adjacent a retention knob seat on the cone; and a retention knob having threaded structure engaged with the threaded bore of the shank, and including a flange on the retention knob seat such that as the retention knob is rotated, the expandable neck is biased toward the seat in the tool holder body.

3. The tool holder of claim 1, in which the shank has a cylindrical section adjacent said collar, and a tapered section adjacent the cylindrical section, and the neck is axially spaced from the collar when the collar is seated on said annular seat such that extreme end of the neck is operable to be radially biased by the holder body toward the axis of rotation of the shank.

4. The tool holder of claim 1, in which the cone has an annular face adjacent the neck, and the tool holder body has an annular shoulder disposed such that the annular face is spaced from said annular flange when the shank collar is seated in the tool holder body.

5. The tool holder as defined in claim 1, in which the expandable neck has an axial split which permits the neck to be radially expanded.

6. The tool holder of claim 1, including threaded fastener means on the tool holder body for engaging a tool in said axial opening to lock the tool against axial motion with respect to the tool holder body.

7. The tool holder of claim 1, in which the axial opening of the tool holder body and the axial opening of the cone are aligned along a common axis.

* * * * *